United States Patent
Manov et al.

(10) Patent No.: US 10,484,385 B2
(45) Date of Patent: Nov. 19, 2019

(54) ACCESSING AN APPLICATION THROUGH APPLICATION CLIENTS AND WEB BROWSERS

(71) Applicant: SAP SE, Walldorf (DE)

(72) Inventors: Milen Manov, Sofia (BG); Jasen Minov, Sofia (BG); Martin Raepple, Lautertal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/730,235

(22) Filed: Jun. 4, 2015

(65) Prior Publication Data

US 2016/0359861 A1 Dec. 8, 2016

(51) Int. Cl.
*H04L 29/06* (2006.01)
*G06F 21/62* (2013.01)

(52) U.S. Cl.
CPC .......... *H04L 63/102* (2013.01); *G06F 21/62* (2013.01); *G06F 21/629* (2013.01)

(58) Field of Classification Search
CPC ..... H04L 63/102; H04L 63/105; G06F 21/62; G06F 21/629; G06Q 10/06
USPC ...................................... 709/225; 726/4, 21
See application file for complete search history.

(56) References Cited

U.S. PATENT DOCUMENTS

| | | | | |
|---|---|---|---|---|
| 7,349,966 B2 * | 3/2008 | Colby | ..................... | G06F 9/548 709/202 |
| 7,380,271 B2 * | 5/2008 | Moran | ................ | G06F 21/6218 713/166 |
| 7,774,830 B2 * | 8/2010 | Dillaway | ............ | G06F 21/6218 713/172 |
| 8,527,774 B2 * | 9/2013 | Fallows | ................ | G06F 21/305 713/168 |
| 8,572,727 B2 * | 10/2013 | Centonze | ................ | G06F 21/57 726/21 |
| 8,595,788 B2 * | 11/2013 | Lim | ....................... | G06Q 10/10 726/1 |
| 8,898,318 B2 * | 11/2014 | Galvin | ................ | H04L 63/0823 709/214 |
| 9,065,828 B2 * | 6/2015 | Yabe | ....................... | H04L 63/10 |
| 9,336,500 B2 * | 5/2016 | Lawson | ................ | H04L 63/102 |
| 9,531,697 B2 * | 12/2016 | Sondhi | .................... | H04L 63/08 |
| 2002/0002613 A1 * | 1/2002 | Freeman | ............... | G06F 9/5027 709/225 |
| 2010/0192193 A1 * | 7/2010 | Olson | ................. | G06F 21/6218 726/1 |
| 2012/0331568 A1 * | 12/2012 | Weinstein | ............. | H04L 12/185 726/29 |

(Continued)

*Primary Examiner* — Oleg Korsak
*Assistant Examiner* — Feliciano S Mejia
(74) *Attorney, Agent, or Firm* — Buckley, Maschoff & Talwalkar, LLC

(57) ABSTRACT

A request from an application client is received at a protected application. The request includes an access token. A grant information associated with the received access token is retrieved. The grant information includes a plurality of intersecting scopes of rights granted to the application client. In another aspect, a session is established between the protected application and the application client. Furthermore, at least one scope of rights from the plurality of intersecting scopes of rights is determined to be mapped to at least one Application Programming Interface (API) from a number of APIs provided by the protected application.

18 Claims, 7 Drawing Sheets

(56) References Cited

U.S. PATENT DOCUMENTS

| 2014/0041055 A1* | 2/2014 | Shaffer | G06Q 10/10 |
| | | | 726/28 |
| 2014/0164544 A1* | 6/2014 | Gagneraud | G06F 21/44 |
| | | | 709/208 |

* cited by examiner

ACCESSING AN APPLICATION THROUGH APPLICATION CLIENTS AND WEB BROWSERS

FIELD

Embodiments described herein generally relate to systems, methods, and apparatus for prevention of unauthorized access to resources of information systems, including a manner of identifying and verifying an entity, a process, or a mechanism requesting access to a resource.

BACKGROUND

Typically, software applications and systems are protected from unauthorized access. For example, authentication and authorization may be required before granting access to an application. An example of such application that is protected may be a web application accessed in a web browser and via the Internet. Usually, the protected application supports authentication and authorization mechanisms for requests from web browsers and application clients to access the protected application. Authentication and authorization mechanisms according to the Java® Platform, Enterprise Edition (EE) specification support access requests from web browsers and direct access requested by application clients based on user roles.

OAuth® is an open standard that provides application clients with delegated authorization mechanism. Java EE specification does not provide authentication based on scopes of rights. For example, authentication and authorization mechanisms in Java are based on user roles having access rights associated thereof, whereas authorization and authentication mechanism according to OAuth are based on scopes of rights delegated by the user to the application client. Modifying a protected application not only to support access based on user roles, but also to support access requests based on scopes of rights may be tiresome and error prone.

SUMMARY

Various embodiments of systems and methods for accessing an application through application clients and web browsers are described herein. In one aspect, a request from an application client is received at a protected application. The request can include an access token. Upon determining that the access token is valid, a grant information associated with the received access token is retrieved. The grant information includes a role of a user, a group of the user, attributes of the user, and a plurality of intersecting scopes of rights granted to the application client, according to one embodiment. In one embodiment, a session is established between the protected application and the application client. The session is based on the plurality of intersecting scopes of rights granted to the application client, the role of the user, the group of the user, and the attributes of the user, it is determined that at least one scope of rights from the plurality of intersecting scopes of rights is mapped to at least one Application Programming Interface (API) from a number of APIs provided by the protected application. The at least one API is accessible for the application client based on the retrieved plurality of intersecting scopes of rights granted to the application client.

These and other benefits and features of embodiments will be apparent upon consideration of the following detailed description of preferred embodiments thereof, presented in connection with the following drawings.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for accessing an application through application clients and web browsers are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

An application client is a client system that accesses a protected application directly, without an intermediary such as a web browser. Application clients may require authorization from resource owners such as users. Upon granting authorization, an application client may receive an access token indicating various access attributes such as scope of rights and validity duration. Additionally, the application client may receive a refresh token associated with the access token. Based on the access token, the application client authenticates to the protected application without sharing user credentials. Typically, the application client autonomously requests access to an application on behalf of users of the application client.

Figure 1:
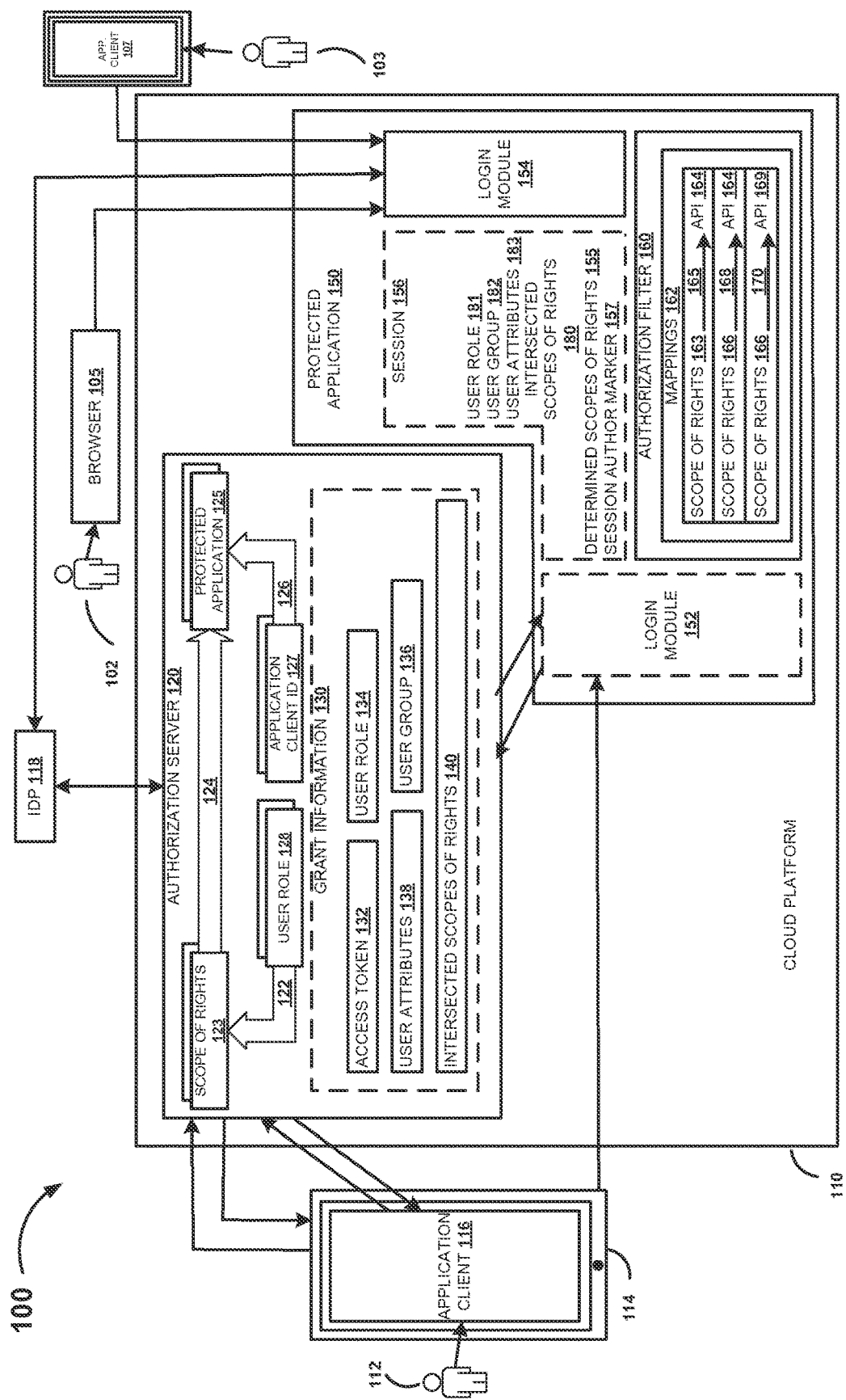
FIG. 1 is a block diagram illustrating a system architecture to provide access to a protected application requested by an application client, according to one embodiment.

FIG. 1 illustrates system architecture 100 to grant to application client 116 access to protected application 150 deployed on cloud platform 110, according to one embodiment. In various embodiments, cloud platform 110 could be an on-demand runtime platform. The cloud platform 110 may include functionality such as resource pooling, where the computing resources of a cloud infrastructure provider are pooled to serve multiple consumers, e.g., utilizing a multi-tenant model. Another functionality the cloud platform 110 may provide is elasticity that refers to the capability of the platform to elastically provision and release computing resources to scale commensurate with demand. The cloud platform 110 may also expose a metering characteristic that refers to the capability of the cloud platform 110 to automatically control, monitor, report, and optimize resource usage at some level of abstraction appropriate to the type of service, for example, storage, processing, bandwidth, and active user accounts, and so on.

The cloud platform 110 can be viewed as containing both a physical layer and an abstraction layer. The physical layer may consist of the hardware resources to support the cloud services being provided, and may typically include server, storage unit, network components, and so on. The abstraction layer may include the software deployed across the physical layer, which manifests functionalities provided by the cloud platform 110. For example, the cloud platform 110 may provide application runtime, user interface (UI) development toolkits, internal configurations, cloud services such as connectivity service, persistence service, identity service, feedback service, document service, etc. The functionality provided by the cloud platform 110 can be utilized by customers of the cloud platform 110 to develop and/or deploy software applications on the cloud platform 110. In some embodiments, the software applications may be developed via functionality of the cloud platform 110. In various embodiments, the cloud platform 110 may also provide support for application lifecycle process, for example, deployment, installation, provisioning and maintenance of applications that may be built, deployed, installed and run on the cloud platform 110. In one embodiment, the cloud platform 110 may be platform-as-a-service implemented in Java.

The protected application 150 may be accessed over the Internet through web browsers such as browser 105 and application (app.) client 107. Protected application 150 may process incoming connection requests via a stack of login modules. The login modules may be implemented according to services and frameworks that extend access control architecture of Java EE to support user-based authorization. An example of such service is Java Authentication and Authorization Service (JAAS) that implements a Java technology version of standard Plugable Authentication Module (PAM) framework. Different login modules may be implemented to utilize different authentication and authorization mechanisms. For example, incoming connection requests based on Security Assertion Markup Language (SAML) authentication and authorization mechanism may be processed by a login module 154 of the protected application 150. The login module 154 may be a SAML login module. By adding different types of login modules to the stack of login modules, the protected application 150 may be configured to process incoming access requests from different types of client systems. The client systems include, but are not limited to, web browsers, voice browsers, application clients, and other software that may access, consume and display web content.

In one embodiment, the protected application 150 may be implemented in Java. The protected application 150 may be secured or protected by authentication and authorization mechanisms according to the Java specification. In such case, protected application 150 may be accessed by users assigned to different user roles associated with varying sets of rights. A set of rights may be determined based on a user role upon granting access. For example, the protected application 150 may include login module 154 to authenticate and authorize users 102 and 103 upon receiving user name and user password. The login module 154 may receive the user name and the user password of users 102 and 103 upon input of credentials. Alternatively, login module 154 may receive confirmation for user name and user password received from an identity provider (IDP) 118. Typically, identity providers provide identity information for users of computer systems requesting access to a system. The IDP 118 may provide information to the login module 154 of the protected application 150 for user 102 of browser 105 and user 103 of application client 107. In one embodiment, the IDP 118 may be an online service or a website that provides confirmation to the authorization server 120 that an application client identifier provided by authenticating application client 116 is registered with the IDP 118. Confirmation may be received via Single Sign-On (SSO). Typically, SSO functionality for web browsers is implemented based on SAML. In such case, the protected application 150 supporting SSO may include login module 154 implementing SAML authentication and authorization mechanism. Login module 154 may process incoming access request according to SAML from users of browsers and application clients such as user 102 of browser 105 and user 103 of application client 107.

Protected application 150 receives access requests through the web browser 105 and authenticates users via SAML, with SSO. According to the Java EE specification a protected application may specify only one authentication and authorization mechanism. But it may be necessary more than one authentication and authorization mechanisms to be triggered. In one embodiment, protected application 150 may be configured to be accessible not only through web browsers, but also accessible by client systems. In one embodiment, the protected application 150 may be configured to process access requests from application clients authenticating via OAuth authentication and authorization mechanism as well as access requests from web browsers and application clients authenticating via SAML. In such case, the protected application 150 can be configured to combine Java FE authentication and authorization mechanisms with OAuth authentication and authorization mechanisms. In one embodiment, the protected application 150 may be configured such that the logic of the application remains unchanged, and the protected application 150 itself may not be modified but may be rather configured to support various authorization mechanisms. In one embodiment, the configuration may be performed while the protected application 150 is running. The configuration may be applied upon restarting the protected application 150. In one embodiment, the protected application 150 may be configured to integrate Java EE and OAuth authentication and authorization mechanisms by adding another login module 152 that supports OAuth in addition to login module 154 that supports Java EE.

Typically, application clients have access to display and input devices, for example via user device 114. Authorization servers such as authorization server 120 may provide secure delegated access of application clients to protected applications. In one embodiment, the secure delegated access may be based on scopes of rights. Such authentication and authorization mechanisms are provided by standard protocols including, but not limited to, OAuth 1.0, OAuth 2.0, Open ID, and others. For application client 116 requesting access to protected application 150, access control is delegated to authorization server 120. The authorization server 120 provides the application client 116 with a secure delegated access to protected application 150. Application client 116 requests access to protected application 150 on behalf of users of the application client 116 such as user 112. User 112 of application client 116 delegates action to application client 116 based on scopes of rights. User 112 may approve one or more scopes of rights that are delegated to application client 116 to access protected application 150.

In one embodiment, application client 116 may register with authorization server 120 to receive permission to access the protected application 150, according the OAuth authentication and authorization mechanism. Authorization server 120 may store application client identifier 127 associated with application client 116. For application client 116 to be granted access to protected application 150, application client identifier 127 of application client 116 is mapped to protected application 125 in mappings 126, Protected application 125 represents a reference to the protected application 150. The application client identifier 127 uniquely identifies application client 116 within authorization server 120. Mappings 126 include one or more mappings of one or more application client identifiers to one or more protected applications. The application client 116 may send an access token request that includes the application client identifier 127. The authorization server 120 compares received application client identifier 127 to a number of application client identifiers from mappings 126. If the application client identifier 127 matches one of the number of application client identifiers from mappings 126, the access token may be provided, Thus, upon the request and based on mappings 126, application client 116 receives access token 132 provided by authorization server 120. To receive the access token 132 from the authorization server 120, the application client 116 may either provide credentials of the user 112 of the application client 116 or open a web browser for the user 112 to provide credentials directly to the authorization server 120. For example, the application client 116 may request credentials input from the user 112 of the application client 116, authenticate the user 112 via SSO or other authenticating mechanisms.

In one embodiment, the application client 116 may be a native client created for a specific platform. For example, the application client 116 may be a Facebook® native client, created for Android® based platform and running on a client system such as device 114 operating under Android operating system. The Facebook native client may be configured to access a protected application. The Facebook protected application may be created in Java programming language and running on the cloud platform 110 and may process specific requests from Facebook native clients, according to one embodiment. Examples of client systems such as device 114 may include, but are not limited to, mobile devices such as a phone, a tablet, a laptop, etc. Further, the application client 116 may be running on devices that are not mobile such as desktop computers, server computers, etc.

In one embodiment, the application client 116 may be deployed on the cloud platform 110. The protected application 150 may also be deployed on the cloud platform 110 and therefore may be accessed by the application client 116, according to one embodiment. In such case the process of authentication and authorization of the application client 116 described above is applied. In one embodiment, application client 116 requests access token 132 from the authorization server 120. In various embodiments, the authorization server 120 is a server that issues access tokens to application clients upon authentication of users of the application clients. The authorization server 120 may be deployed on a web server hosting various applications. In one embodiment, the protected application 150 may be hosted on the same web server, in another embodiment, the authorization server 120 and/or the protected application 150 may be independently deployed on the cloud platform 110. The authorization server 120 may issue various access tokens based on which access to multiple protected applications is controlled and provided.

In one embodiment, upon authenticating the user 112 of the application client 116, various types of information for the user 112 are retrieved from the IDP 118. Further, the IDP 118 may provide other information for the authenticating user 112 of the application client 116. In one embodiment, the IDP 118 may be deployed on the cloud platform 110. In one embodiment, the IDP 118 may be external to the cloud platform 110. The IDP 118 may provide information for users of multiple platforms of the same or different kind.

In one embodiment, the request from the application client 116 to the authorization server 120 may include the application client identifier 127 and one or more scopes of rights requested to be granted to the application client 116. A scope of rights is a set of actions the application client 116 may be operable to execute or perform in the protected application 150 on behalf of the user 112. The scope of rights is granted to the application client 116 by the authorization server 120. In one embodiment, the authorization server 120 may grant at least one scope of rights to the application client 116 based on a policy of the authorization server 120 or instructions from the user 112. Identification of the protected application 150 from a number of protected applications deployed on the cloud platform 110 is based on the received application client identifier 127.

Once the information for the authenticated user 112 is retrieved from the IDP 118, grant information 130 is created in the authorization server 120. The grant information 130 includes various types of user information retrieved from the IDP 118. Grant information 130 includes information such as user role 134, user group 136, and user attributes 138. In one embodiment, the user role 134 may define a set of permissions or access rights for users of the protected application 150, in one embodiment, the grant information 130 may include one or more of user role 134 and one or more of user group 136. For example, a user with role "employee" may have permission to view information in the protected application 150. Another user of the protected application 150 with role "administrator" may have further permission to modify information in the protected application 150. The user group 136 may be a set of users of the protected application 150 classified by common criteria. For example, the set of users may be grouped by a type of access right. In one embodiment, the set of users of the protected application 150 may be classified by common user role 134. For example, a group "administrators" may consist of users of the protected application 150 classified by common role "administrator". The user attributes 138 may be an element that includes information for the user 112. User attributes 138 may include, but is not limited to, first name of the user 112, last name of the user 112, address of the user 112, phone number of the user 112, e-mail of the user 112.

In one embodiment, mappings 122, 124, and 126 may be created in the authorization server 120 deployed on the cloud platform 110. Mappings 122 associates user roles to scopes of rights. For example, mappings 122 associates user role 128 to scope of rights 123. Mappings 122 are created to define scopes of rights, which correspond to rights included in the user role. Mappings 124 are created to define one or more sets of scopes of rights that can be granted to corresponding one or more protected applications. In one embodiment, mappings 124 specifies a set of scopes of rights 123 that can be granted for protected application 125. Protected application 125 represents a reference to the protected application 150. For example, scope of rights "read e-mail", scope of rights "send e-mail", scope of rights "delete e-mail", and scope of rights "archive e-mail" may be specified to be rights that can be granted for the protected application 125. Thus, scope of rights 123 is mapped to protected application 125 to be capable of being granted to protected application 125. For example, user role 128 may be a user role as defined according to the Java EE specification and access may be granted based on user roles that are associated with a set of access rights. Whereas, according to OAuth standard, access may be granted based on a set of scopes of rights delegated by the user 112 to the application client 116, according to one embodiment. By associating Java user roles and OAuth scopes of rights, scopes of rights granted by user 112 for application client 116 can be restricted based also on a Java role assigned to the user 112. For example, Java role "employee" may be associated with scope of rights "read e-mail" and scope of rights "archive e-mail", therefore user 112 with user role "employee" will be allowed to grant the application client 116 one or more of the scopes of rights "read e-mail" and "archive e-mail".

Upon receiving the access token request from the application client 116, the authorization server 120 may accept, reject or may partially reject the number of requested scopes of rights. In one embodiment, the authorization server 120 intersects scopes of rights requested by application client 116 with scope of rights 123, which are mapped to a user role 128 in mappings 122. Intersecting scopes of rights requested by application clients with scope of rights mapped to a user role determines scopes of rights from the requested scopes of rights, which correspond to rights included in the user role. Authorization server 120 further intersects the requested scopes of rights with scope of rights 123, which are mapped to protected application 125. Further, intersecting the determined requested scopes of rights which correspond to rights included in the role with scope of rights mapped to a protected application determines scope of rights that are requested, also can be granted to the protected application, and also correspond to rights included in the user role.

Intersection of mappings 122 and 124 with the requested scopes of rights determines intersected scopes of rights 140. The intersected scopes of rights 140 specifies scopes of rights that are common with scope of rights granted to the application client 116 based on requested scopes of rights, scopes of rights mapped to user role of user 112 and scopes of rights that can be granted for the protected application 150. For example, the application client 116 may send an access token request to access the protected application 150 including requested scopes of rights "read e-mail", "send e-mail", "delete e-mail", "archive e-mail", and "restore deleted e-mail". Upon authentication of the user 112 of the application client 116, the user role "employee" is retrieved from the IDP 118. Based on the mappings 122 and 124 the intersected scopes of rights 140 may include the scope of rights "read e-mail" and the scope of rights "archive e-mail", according to one embodiment.

Once the intersected scopes of rights 140 are determined, the intersected scopes of rights 140 may be sent to the user 112 of the application client 116 for approval. In one embodiment, the authorization server 120 receives from the user 112 of the application client 116 approval of the intersected scopes of rights 140. Upon receiving the approval, the authorization server 120 amends the grant information 130 to include the approved intersected scopes of rights 140.

Upon adding the intersected scopes of rights 140 to the grant information 130, an authorization code may be provided to the application client 116 by the authorization server 120. The authorization code may be a credential representing the authorization of the user 112 of the application client 116 to access the protected application 150. The application client 116 may obtain an access token (e.g., 132) from the authorization server 120 based on the authorization code. In one embodiment, the authorization code may have finite validity time. In various embodiments, the access token 132 may be a string indicating a number of access attributes including, but not limited to, a specific scope of rights and validity time. Access tokens are provided to application clients by the authorization server 120 upon authentication and scope of rights determination. In one embodiment, the authorization code may be included in a second access token request from the application client 116 to the authorization server 120. The second access token request may not require action from the user 112 of the application client 116. During this request the authorization server 120 may authenticate the application client 116. Further, the user 112 of the application client 116 may not be notified for the second access token request. In one embodiment, the authorization server 120 associates the authorization code with the grant information 130 to authorize requests for access token, where the requests include the authorization code.

The authorization server amends the grant information 130 to include the access token 132 and thus associate elements included in the grant information 130 with the issued access token 132. Based on the access token 132 corresponding grant information 130 is sent to login module 152 to establish a session based on the user role 181, user attributes 183, user group 182 and intersected scopes of rights 180. User role 181, user attributes 183, user group 182 and intersected scopes of rights 180 of session 156 in the protected application 150 represent references to corresponding user role 134, user attributes 138, user group 136 and intersected scopes of rights 140 of grant information 130 in the authorization server 120.

In one embodiment, the application client 116 sends a direct request to the protected application 150. The protected application 150 may be configured to process direct requests from the application client 116 through a login module 152 and requests from the browser 105 and the application client 107 through the login module 154. The login module 152 may be configured based on the OAuth authentication and authorization mechanism, according to one embodiment. The login module 154 may be configured, for example, based on the SAML authentication and authentication mechanism. Login module 152 and login module 154 may be included in a stack of login modules of the protected application 150, according to one embodiment.

Upon receiving the direct request from the application client 116, the login module 152 may redirect the received access token 132 to the authorization server 120 in a request for information for the received access token. The authorization server 120 may identify the access token 132 in the grant information 130. The authorization server 120 may check validity of the access token. If the access token is valid, authorization server 120 authorizes the request from application client 116. Upon authorization, authorization server 120 may send the grant information 130 to the login module 152.

Upon receiving the grant information 130 at the login module 152, a session 156 is established. In one embodiment, the session 156 may be established between application client 116 and the protected application 150 based on OAuth protocol. Information included in session 156 may include, but may not be limited to, user role 181, user group 182, user attributes 183, and the intersected scopes of rights 180. The session 156 may be created by OAuth login module 152. In one embodiment, the session 156 may be marked with a session author marker 157. The session author marker 157 signifies that the session 156 is created by the login module 152. The session author marker 157 may be added to the session 156 to differentiate between sessions established by the login module 152 and sessions established by the login module 154. For example, to differentiate between OAuth session and SAML session. OAuth is a not standard for creating sessions and thus application clients configured according to the OAuth authentication and authorization mechanism do not utilize session identifiers (e.g., cookies) to connect to existing sessions. Instead, application clients authenticate via access token and a new session is created for successfully authenticated clients. To prevent establishment of large number of OAuth sessions, the OAuth sessions are marked with session author markers like the session author marker 157.

In one embodiment, upon establishing session 156, authorization filter 160 compares the intersected scopes of rights 180 to mappings 162. The mappings 162 include mappings 165, 168, and 170 of scopes of rights to APIs. In various embodiments, an API may represent a web resource, an end point or a Hypertext Transfer Protocol (HTTP) access point that may be requested and provided accordingly. Mappings 162 specifies an association between scopes of rights and APIs of the protected application 150, according to one embodiment. For example, scope of rights 163 may be associated to API 164 in mapping 165. For example, scope of rights 163 "read e-mail" may be associated to "read e-mail" API 164 of the protected application 150, according to one embodiment. In one embodiment, scope of rights 166 may be associated to more than one API in mappings 168 and 170. For example, scope of rights 166 "archive e-mail" may be associated to API 164 "read e-mail" in mapping 168. Further, scopes of rights 166 "archive e-mail" may be associated to APT 169 "archive e-mail." in mapping 170 of the protected application 150.

The authorization filter 160 may process the request to access the protected application 150 and then the login module 152 may accept or deny the request. When at least one scope of rights from the intersected scopes of rights 180 is mapped to an API in the mappings 162, the request to the protected application 150 is to be accepted. For example, scope of rights 163 to be mapped to API 164. APIs of the protected application 150 that are mapped to scopes of rights from the intersected scopes of rights 180 in mappings 162 may be determined by the login module 152 to be operable for the application client 116. Scopes of rights determined as mapped to APIs in mappings 162 are then included in the session 156. Determined scopes of rights 155 specify operable APIs for the application client 116 within the session 156.

Since OAuth is not a standard for creating sessions and does not utilize session identifiers to connect to existing sessions, the session 156 created by the login module 152 for the application client 116 may not be accessed on subsequent requests, according to one embodiment. Therefore, different sessions may be created for subsequent requests from the application client 116. As a consequence, large number of sessions may cause a decrease of the protected application 150 performance. To address the performance decrease, the authorization filter 160 may check for session author marker 157 in the session 156 upon termination of the request by the application client 116. The authorization filter 160 may destroy the session 156 in case a session author marker 157 is discovered. The described configuration enables session per request functionality of the protected application 150 for client systems similar to application client 116.

Figure 2:
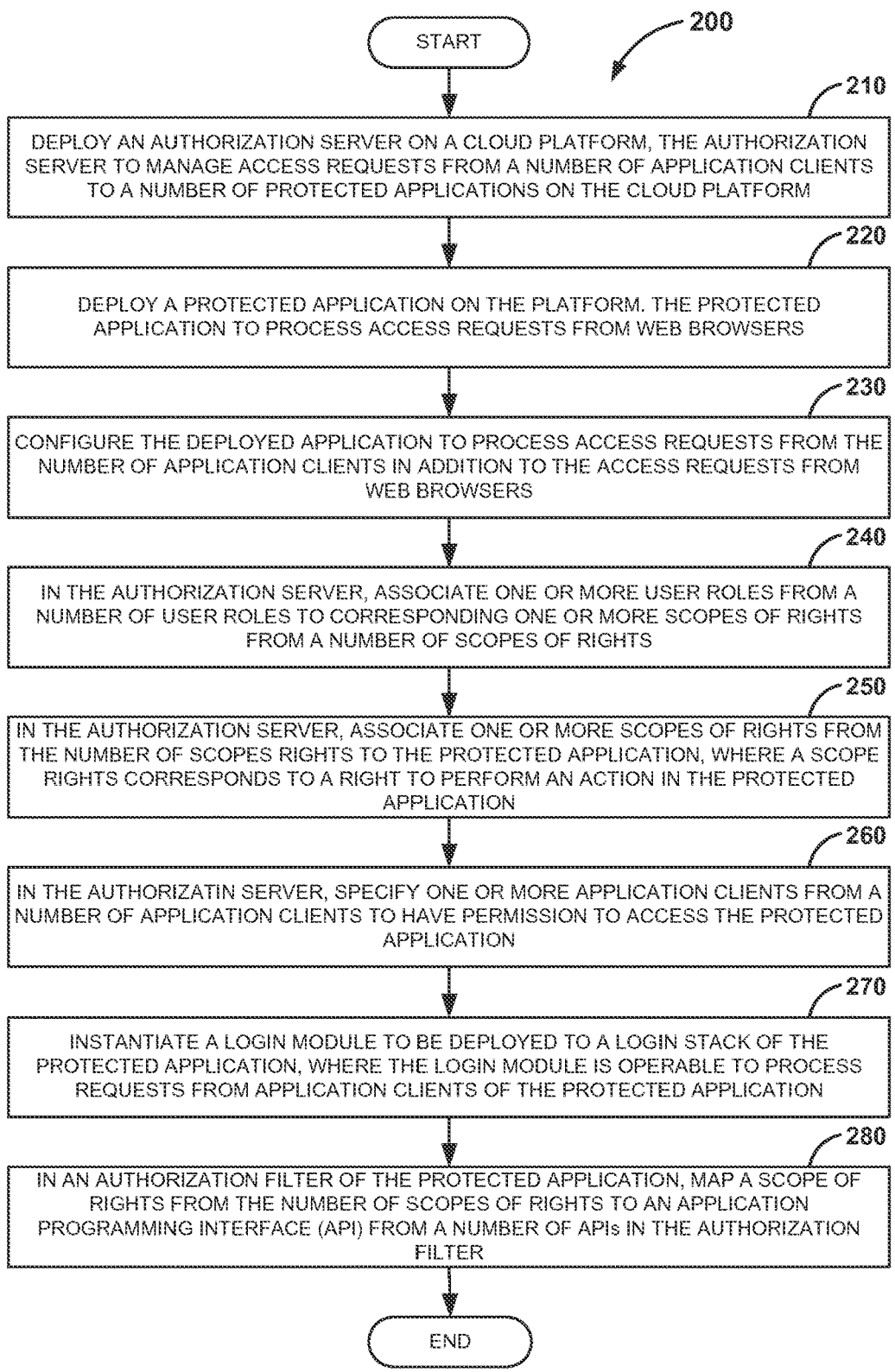
FIG. 2 is a flow diagram illustrating a process to configure an authorization server and a protected application, according to one embodiment.

FIG. 2 illustrates process 200 to configure an authorization server and to configure a protected application, according to one embodiment. At 210, the authorization server is deployed on a cloud platform. The authorization server manages access requests from a number of application clients to a number of protected applications, deployed on the cloud platform. At 220, the protected application is deployed on the cloud platform. The protected application may be configured during deployment to process requests from web browsers. At 230, the protected application is configured to process requests from application clients, e.g., in addition to the requests from web browsers, according to one embodiment. Once configured, additional login methods may be provided during runtime by instantiating a login module that process access requests based on authentication and authorization mechanism operable to authorize requests from application clients, such as OAuth authentication and authorization mechanism.

At 240, one or more user roles from a number of user roles are associated to corresponding one or more scopes of rights from a number of scopes of rights in the authorization server. An association is created to define scopes of rights that correspond to rights included in a user role. In one embodiment, a single user role may be associated to a set of scopes of rights from the number of scopes of rights, in another embodiment, a set of user roles from the number of user roles may be associated to the set of scopes of rights from the number of scopes of rights.

At 250, one or more scopes of rights from the number of scopes of rights are associated to the protected application. A scope of rights corresponds to a right to perform an action in the protected application, according to one embodiment. In one embodiment, a scope of rights may correspond to a right to access resources of the protected application, such as a web resource, an HTTP access point, etc. Association of scopes of rights to the protected application specifies a set of scopes of rights that can be granted to different application clients for the protected application. In one embodiment, a scope of rights or a set of scopes of rights from the number of scopes of rights may be associated to the protected application. In another embodiment, the scope of rights or the set of scopes of rights from the number of scopes of rights may be associated to a number of protected applications on the cloud platform.

At 260, one or mare application clients that have permission to access the protected application are specified. For example, a mapping is created to associate an application client identifier to a protected application. The one or more application clients may share the same application client identifier that is mapped to the protected application. In one embodiment, a number of mappings of application client identifiers to protected applications is created in the authorization server. At 270, a login module is deployed and instantiated in a login stack of the protected application. The login module is operable to process access requests from application clients of the protected application. In one embodiment, the login module may process access requests from application clients configured according to the OAuth authentication and authorization mechanism. At 280, a scope of rights from the number of scopes of rights is mapped to an API from a number of APIs, e.g., in an authorization filter. In one embodiment, the scope of rights from the number of scopes of rights may be mapped to a set of APIs from the number of APIs. Mapping of scopes of rights to APIs is created to specify APIs accessible or executable by the application client, based on an intersected number of scopes.

Figure 3A:
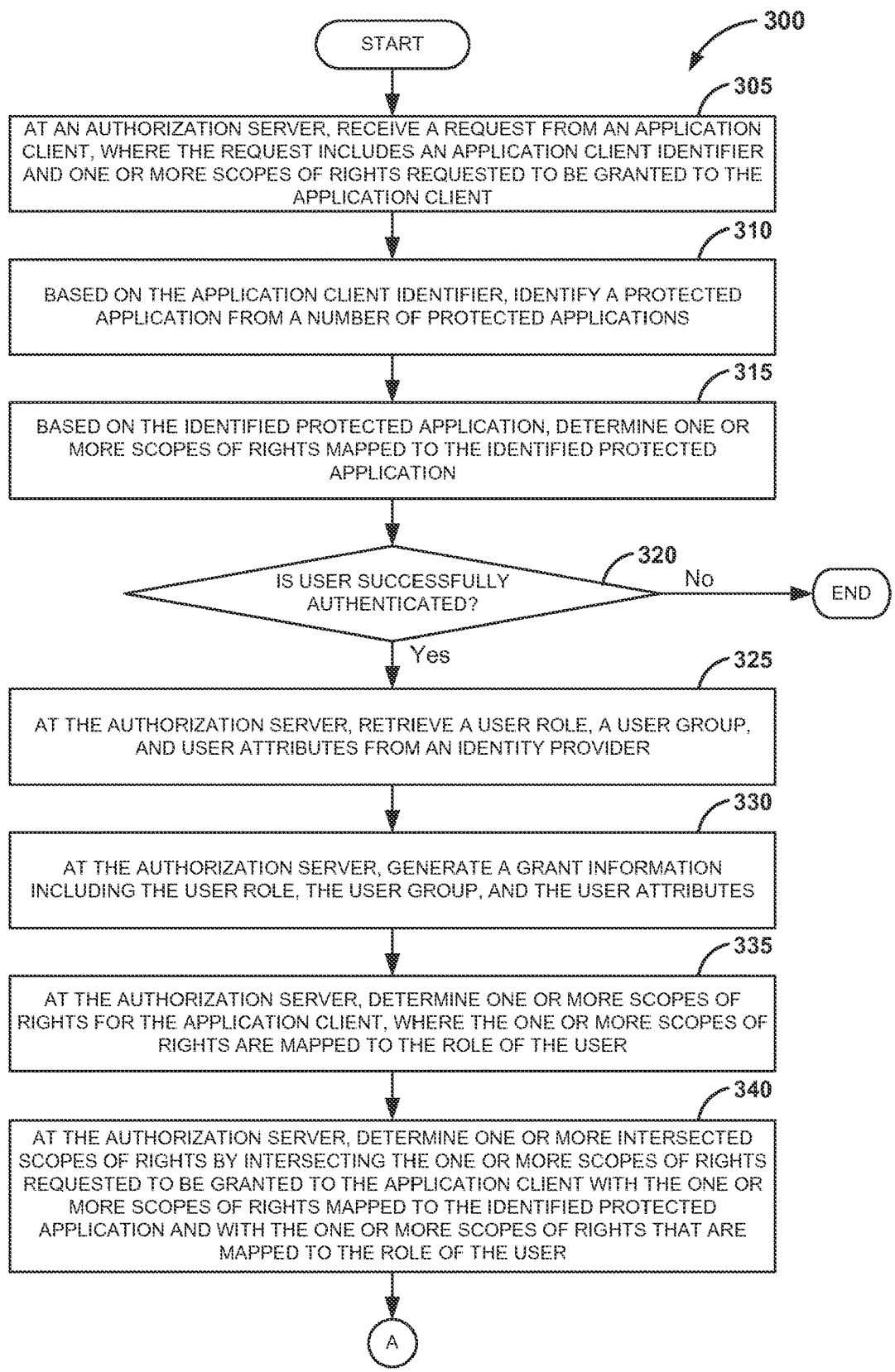
FIGS. 3A-B are flow diagrams illustrating two parts of a process to provide an access token to an application client upon authentication of a user of the application client, according to one embodiment.
Figure 3B:
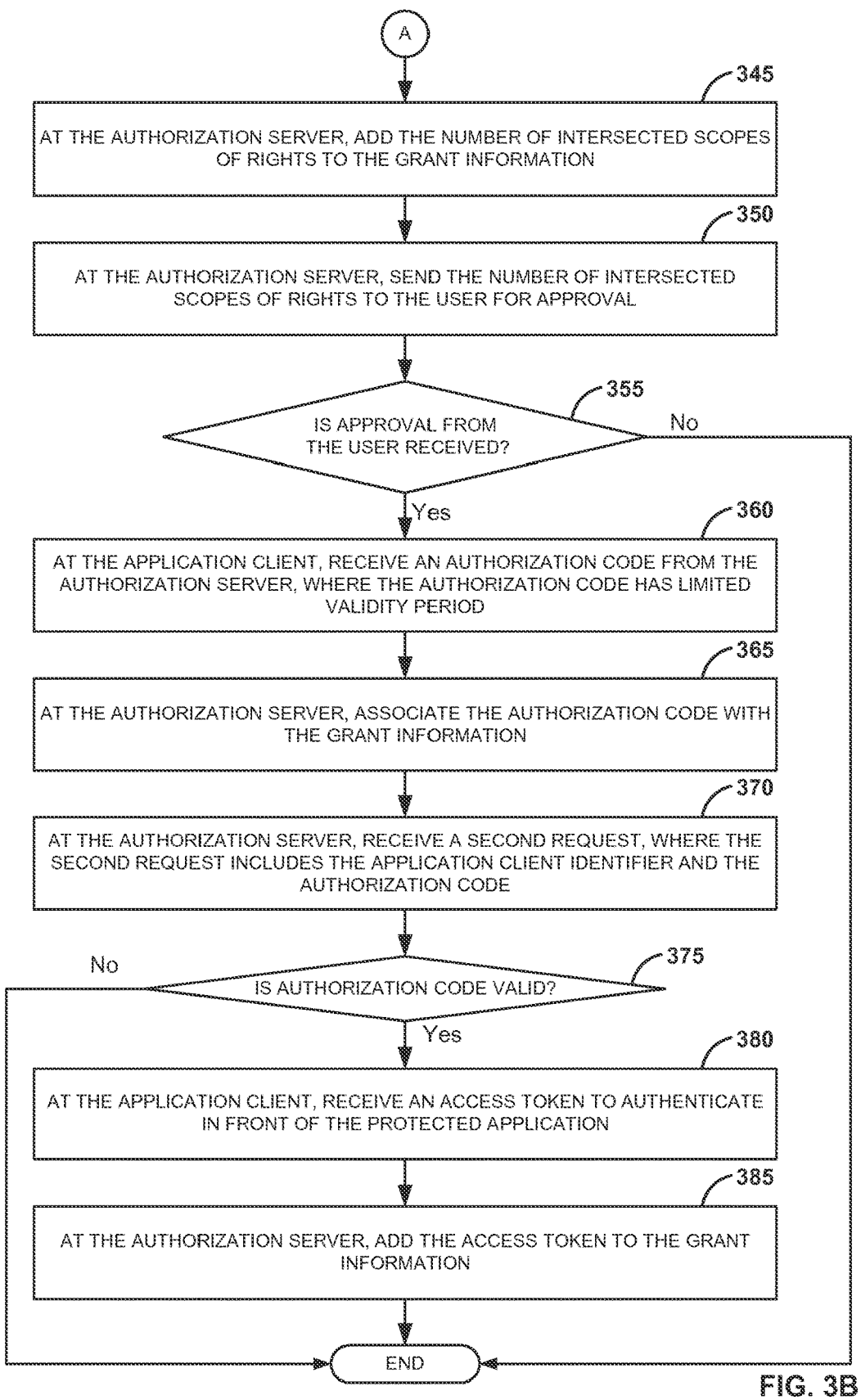

FIGS. 3A-B illustrate process 300 to provide an access token to an application client upon authentication of a user of the application client, according to one embodiment. At 305 (FIG. 3A), a request for access token is received from the application client. In one embodiment, the request for access token includes an application client identifier and one or more requested scopes of rights. At 310, a protected application from a number of protected applications on a cloud platform is identified based on the application client identifier. Protected applications on the cloud platform may be mapped to application client identifiers in an authorization server memory, according to one embodiment. Based on the application client identifier mapped to a protected application, it is determined which is the protected application that can be accessed by the application client requesting the access.

Further, at 315, one or more scopes of rights mapped to the protected application in the authorization server memory are determined. In one embodiment, a scope of rights or a set of scopes of rights may be mapped to the protected application in the authorization server memory. Based on scopes of rights mapped to the protected application, it is determined which scopes of rights from the number of requested scopes of rights can be granted for the protected application. At 320, it is checked whether the user has been successfully authenticated. In one embodiment, the user of the application client may not be successfully authenticated and therefore the process to provide the access token to the application client may be discontinued. When the user of the application client is successfully authenticated, at 325, a role of the user, a group of the user and attributes of the user are retrieved from an identity provider (IDP).

At 330, a grant information is generated. The grant information includes the role of the user, the group of the user, and the attributes of the user. At 335, one or more scopes of rights mapped to the role of the user are determined. Based on scopes of rights mapped to user role it is determined by the user which scopes of rights from the number of requested scopes of rights may be granted to the application client. In one embodiment, the one or more scopes of rights may be mapped to the role of the user in the authorization server memory to define scopes of rights, which correspond to rights included in a user role. At 340, one or more intersected scopes of rights are determined by intersecting the one of more requested scopes of rights, the one or more scopes of rights mapped to the protected application, and the one or more scopes of rights mapped to the role of the user. The intersected scopes of rights represent scopes of rights to be granted to the application client. Scopes of rights to be granted to the application client depend on both role of the user of the application client and protected application which the application client can access. Therefore, intersection between scopes of rights mapped to a user role, scopes of rights mapped to the protected application and the requested scopes of rights is needed.

At 345 (FIG. 3B), the intersected scopes of rights are added to the grant information. At 350, the intersected scopes of rights are sent to the user of the application client for approval. Upon approval from the user, the application client is granted access to the protected application within approved scopes of rights.

At 355, it is checked whether an approval is received. In one embodiment, the intersected scopes of rights may not be approved by the user of the application client and thus the process to provide the access token to the application client may be discontinued. When the intersected scopes of rights is approved by the user of the application client, at 360, an authorization code is received at the application client. Once the authorization code is received at the application client, at 365, the authorization code is associated with the grant information. The association with the authorization code verifies a relation between authenticated user for which the grant information is created and authorized application client.

At 370, a second request for access token is received. The request may include the application client identifier and the authorization code. At 375, it is checked whether the authorization code is valid, in one embodiment, the authorization code may be invalid, for example if the authorization code has expired. Therefore, the process to provide the access token to the application client may be discontinued. When the authorization code is valid, at 380, an access token is provided to the application client, according to one embodiment. The application client may authenticate to a protected application based on the access token. At 385, the provided access token is added to the grant information in the authorization server memory. When the access token is received (e.g., as part of an authentication request from a protected application to the authorization server) corresponding grant information is sent to the protected application.

Figure 4A:
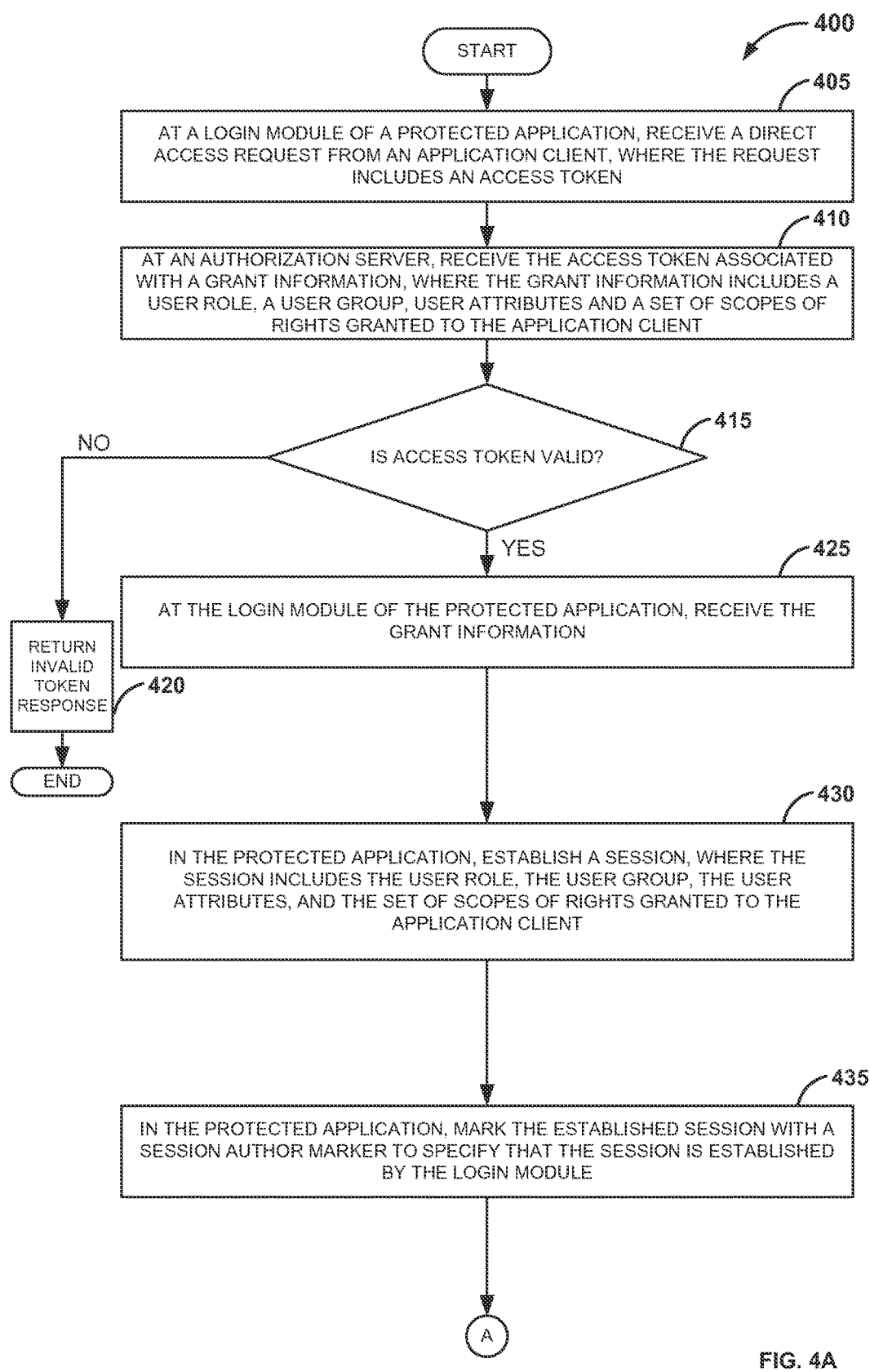
FIGS. 4A-B are flow diagrams illustrating two parts of a process to authenticate and authorize an application client that requests to access a protected application, according to one embodiment.
Figure 4B:
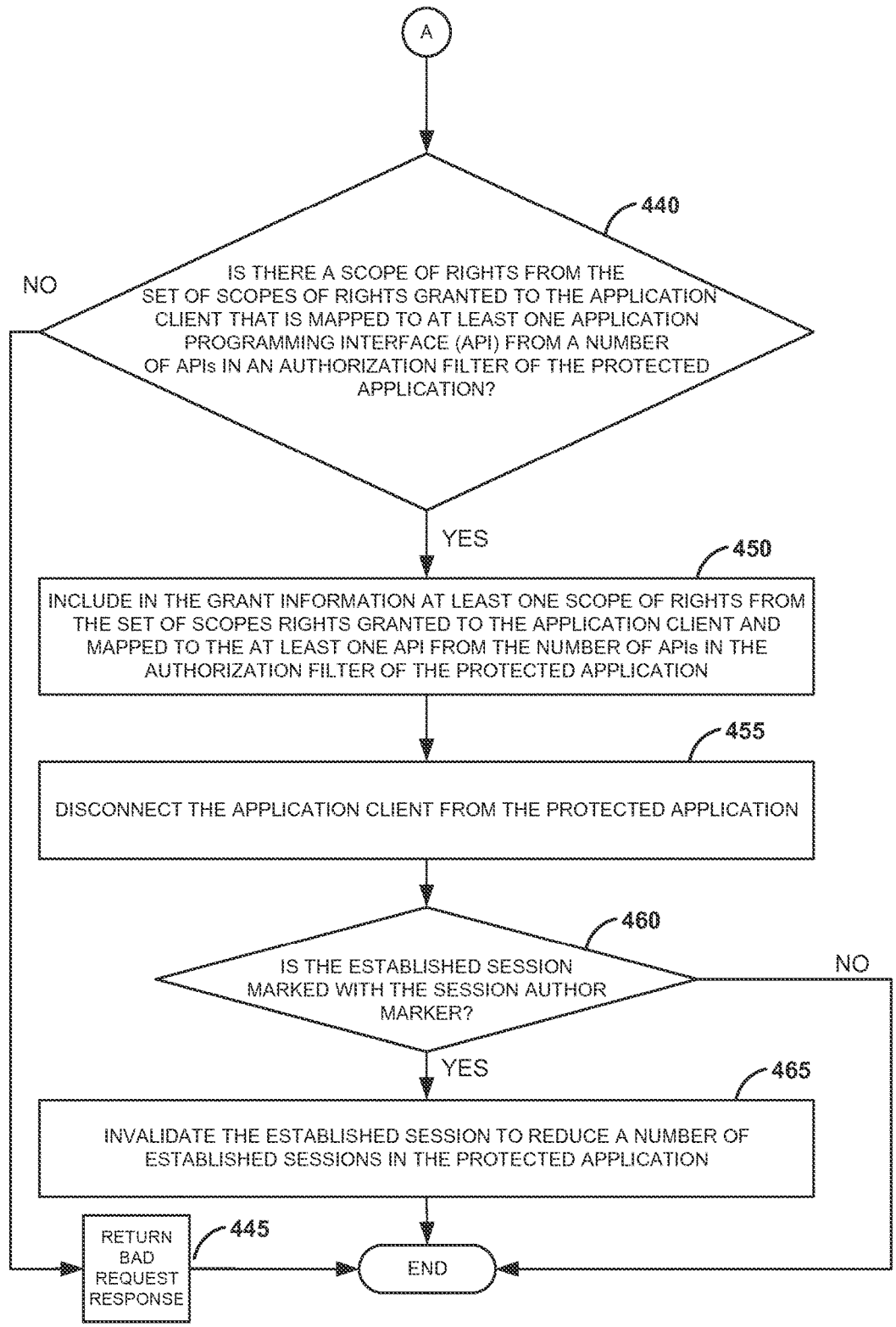

FIGS. 4A-B illustrate process 400 to authenticate and authorize an application client requesting access to a protected application, according to one embodiment. At 405 (FIG. 4A), a direct access request from the application client is received. The request may be received at a login module of the protected application. In one embodiment, the request may include an access token. The login module may be specifically configured to process requests from application clients. The login module and the application clients may communicate according to the same authentication and authorization mechanism, according to one embodiment.

At 410, the received access token is forwarded by the login module to an authorization server for authentication. The login module, the authorization server, and the application client may be based on the same authentication and authorization framework. For example, the authorization server may be an OAuth authorization server configured to provide access tokens to OAuth application clients. The access tokens may be provided upon authentication of application client users and determination of intersected scopes of rights. Further, the OAuth authorization server may be configured to authenticate an OAuth application client with an OAuth login module of the protected application. Authentication may be performed by receiving the access token and, in response, providing information for the OAuth application client and the user of the OAuth application client, according to one embodiment.

At 415, it is checked whether the forwarded access token is valid. In one embodiment, the authorization server may find the access token invalid, when, for example, the access token was issued with a limited validity period, and, at 420, return invalid access token response. For example, the access token may be originally issued to the application client with a limited validity period and in pair with a refresh token to be sent to the authorization server at a later stage to receive a valid access token.

When the access token is determined valid by the authorization server, at 425, a grant information is received at the login module of the protected application. The grant information may include a role, a group, attributes of the user of the application client, and the intersected scopes of rights granted to the application client, according to one embodiment.

Upon receiving the grant information, at 430, a session with the application client is established. In one embodiment, the session may be established by the login module. The session may be based on the grant information and may include the intersected scopes of rights granted to the application client, according to one embodiment.

At 435, the established session is marked with a session author marker. In one embodiment, a number of login modules of the protected application may process requests from a number of software clients. The login modules may be configured according to different authentication and authorization mechanisms. A direct request from a software client may be processed by different corresponding login module in the protected application based on the authentication and authorization mechanism, according to one embodiment. The session author marker may differentiate between sessions created by different login modules. For example, a session created by the OAuth login module may be marked with a session author marker to be differentiated from a session created by a SAML login module. Restrictions are applied on sessions created by the OAuth login module based on scopes of rights and user roles, whereas sessions created by the SAML login module receive restrictions based on user roles.

At 440 (FIG. 4B), it is checked whether at least one scope of rights from the intersected scopes of rights granted to the application client is mapped to at least one API from the number of APIs. An API is specified as accessible for the protected application by mapping the API to at least one scope from the intersected scopes of rights. The check may be performed by an authorization filter of the protected application. In one embodiment, the check may determine that there is no scope of rights mapped to an API. Thus, at 445, a bad request response may be returned and the process 400 of authenticating and authorizing the application client that is requesting access the protected application may be discontinued.

At 450, the at least one scope of rights from the intersected scopes of rights is included in the established session to specify APIs operable for the application client within the established session. At 455, the application client disconnects from the protected application. At 460, it is checked whether the established session is marked. In one embodiment, the established session may not be marked. When the session is marked, at 465, session invalidation is performed to prevent the protected application from flooding with sessions.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer through an interpreter. For example, an embodiment may be implemented according to Java, C++, or other object-oriented programming language and development tools. Another embodiment may be implemented in hard-wired circuitry in place of, or in combination with machine readable software instructions.

Figure 5:
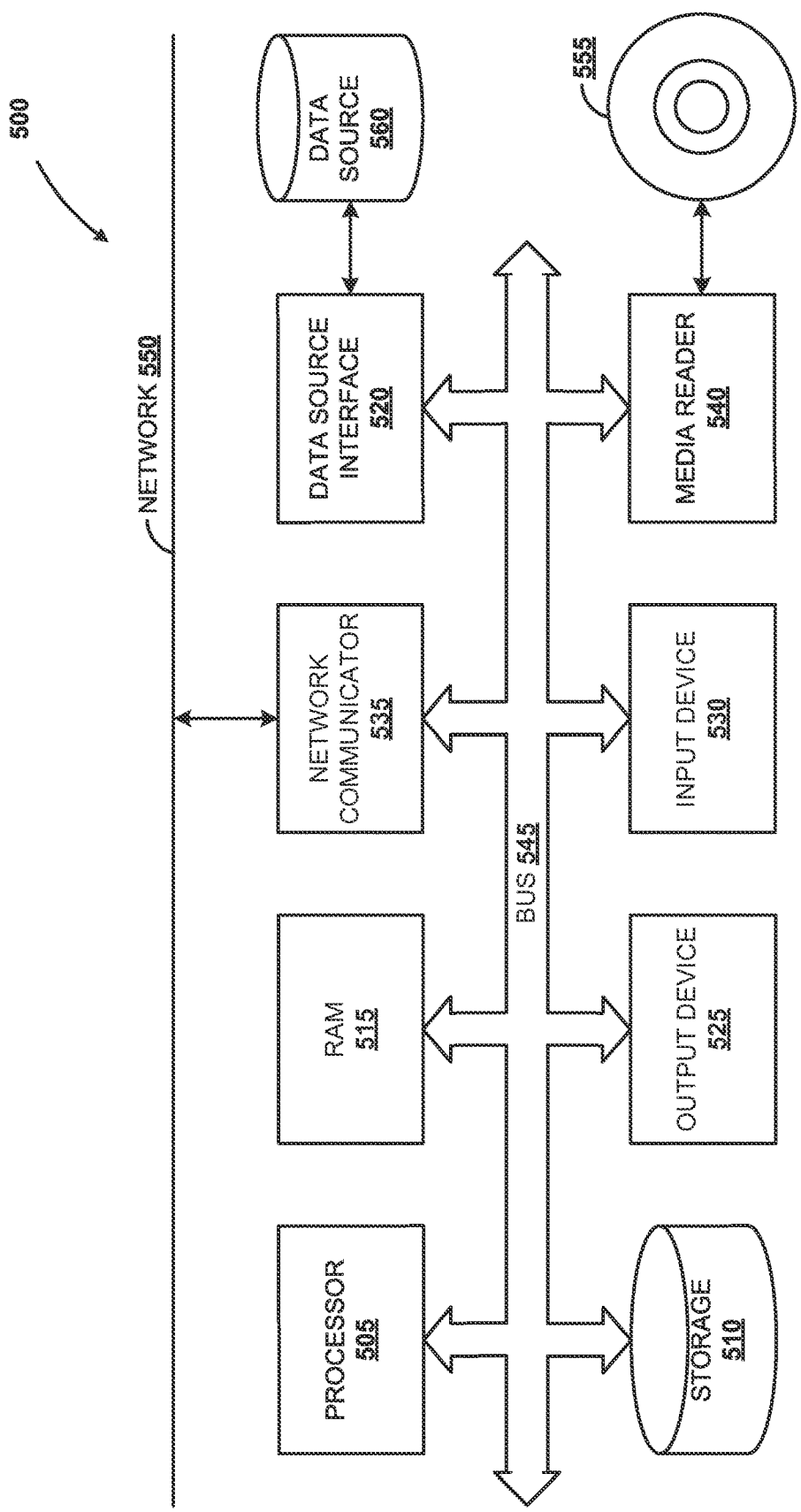
FIG. 5 is a block diagram illustrating an exemplary computer system, according to one embodiment.

FIG. 5 is a block diagram of an exemplary computer system 500. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, all of the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however, that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A method comprising:
    deploying an authorization server to control access of one or more application clients to a plurality of protected applications;
    receiving, at a protected application of the plurality of protected applications, a request comprising an access token from an application client of the one or more application clients which is associated with a user, wherein the access token is issued by the authorization server during authorization of the application client for accessing the protected application;
    upon determining that the access token is valid at the protected application, retrieving, from the authorization server, grant information comprising intersecting scopes of rights between Open Authorization (OAuth) rights requested to be granted to the application client at the authorization server, rights mapped to a Java role of the user at the authorization server, and rights mapped to the protected application, wherein the intersecting scopes of rights comprises an overlap between corresponding scopes of the rights of the OAuth rights requested to the granted, the rights mapped to the Java role of the user, and the rights mapped to the protected application; and
    establishing a direct session between the application client and the protected application based on the intersecting scopes of rights.

2. The method of claim 1, further comprising processing a request based on at least one scope of rights delegated to the application client that is mapped to at least one API provided by the protected application and accessible by the application client.

3. The method of claim 1, wherein establishing the session with the application client further comprises:
    marking the established session with a session author marker to specify the session is based on the intersecting scopes of rights.

4. The method of claim 3 further comprises:
    disconnecting the application client from the protected application; and
    invalidating the established session to reduce a number of established sessions in the protected application upon determining that the established session is marked.

5. The method of claim 1 further comprises:
    determining the intersecting scopes of rights by further intersecting the intersecting scopes of rights with a third set of scopes of rights mapped to the protected application.

6. The method of claim 5 further comprises:
    sending a request to the user to approve the determined plurality of intersecting scopes of rights; and
    upon approval, adding the plurality of intersecting scopes of rights to the grant information.

7. The method of claim 5 further comprises:
    sending the access token for authentication with the protected application to the application client; and
    associating the access token with the grant information.

8. A non-transitory computer readable medium storing instructions, which when executed by at least one processor cause a computer to:

deploy an authorization server to control access of one or more application clients to a plurality of protected applications;

receive, at a protected application of the plurality of protected applications, a request comprising an access token from an application client of the one or more application clients which is associated with a user, wherein the access token is issued by the authorization server during authorization of the application client for accessing the protected application;

upon determining that the access token is valid at the protected application, retrieve, from the authorization server, grant information comprising intersecting scopes of rights between Open Authorization (OAuth) rights requested to be granted to the application client at the authorization server, rights mapped to a Java role of the user at the authorization server, and rights mapped to the protected application, wherein the intersecting scopes of rights comprises an overlap between corresponding scopes of the rights of the OAuth rights requested to the granted, the rights mapped to the Java role of the user, and the rights mapped to the protected application; and establish a direct session between the application client and the protected application based on the intersecting scopes of rights.

9. The computer readable medium of claim 8, wherein the executed instructions further cause the computer to:

mark the established session with a session author marker to specify the session is based on the intersecting scopes of rights;

disconnect the application client from the protected application; and invalidate the established session to reduce a number of established sessions in the protected application upon determining that the established session is marked.

10. The computer readable medium of claim 8, wherein the executed instructions further cause the computer to:

determine the intersecting scopes of rights by further intersecting the intersecting scopes of rights and a third set of scopes of rights mapped to the protected application.

11. The computer readable medium of claim 10, wherein the executed instructions further cause the computer to:

send a request to the user to approve the intersecting scopes of rights;

upon approval, add the plurality of intersecting scopes of rights to the grant information;

send the access token for authentication with the protected application to the application client; and associate the access token with the grant information.

12. The method of claim 1, wherein the establishing comprises establishing a communication session between the application client and the protected application based on OAuth protocol.

13. A computing system comprising:

a hardware processor configured to deploy an authorization server to control access of one or more application clients to a plurality of protected applications; and a network communicator configured to receive, via a protected application of the plurality of protected applications, a request comprising an access token from an application client of the one or more application clients which is associated with a Java user, wherein the access token is issued by the authorization server during authorization of the application client for accessing the protected application, wherein the hardware processor is further configured to retrieve grant information comprising intersecting scopes of rights between Open Authorization (OAuth) rights requested to be granted to the application client at the authorization server, and rights mapped to a Java role of the Java user at the authorization server, and rights mapped to the protected application, wherein the intersecting scopes of rights comprises an overlap between corresponding scopes of the rights of the OAuth rights requested to the granted, the rights mapped to the Java role of the user, and the rights mapped to the protected application, and establish a direct session between the application client and the protected application based on the intersecting scopes of rights.

14. The computing system of claim 13, wherein the hardware processor is further configured to process a request based on at least one scope of rights delegated to the application client that is mapped to at least one API provided by the protection protected application and accessible by the application client.

15. The computing system of claim 13, wherein the hardware processor is further configured to mark the established session with a session author marker to specify the session is based on the plurality of intersecting scopes of rights.

16. The computing system of claim 15, wherein the hardware processor is further configured to disconnect the application client from the protected application, and invalidate the established session to reduce a number of established sessions in the protected application upon determining that the established session is marked.

17. The computing system of claim 13, wherein the hardware processor is further configured to control the network communicator to transmit a request to the user to approve the determined plurality of intersecting scopes of rights, and upon approval, add the plurality of intersecting scopes of rights to the grant information.

18. The computing system of claim 13, wherein the hardware processor is configured to establish a communication session between the application client and the protected application based on OAuth protocol.

* * * * *